United States Patent [19]
Ohtomo et al.

[11] Patent Number: 5,847,824
[45] Date of Patent: Dec. 8, 1998

[54] AUTOMATIC ANGLE COMPENSATOR

[75] Inventors: Fumio Ohtomo; Hiroo Sugai; Ikuo Ishinabe; Jun-ichi Kodaira, all of Tokyo-to, Japan

[73] Assignee: Kabushiki Kaisha Topcon, Tokyo-to, Japan

[21] Appl. No.: 415,347

[22] Filed: Apr. 3, 1995

[30] Foreign Application Priority Data

Apr. 8, 1994 [JP] Japan ................................. 6-095729

[51] Int. Cl.⁶ .................................................. G01C 9/18
[52] U.S. Cl. .................................... 356/249; 33/366
[58] Field of Search ................................ 356/148, 149, 356/138, 250, 248, 249; 33/DIG. 21, 286, 290–291, 391, 402, 277, 281, 366, 377; 172/4.25

[56] References Cited

U.S. PATENT DOCUMENTS

| | | | |
|---|---|---|---|
| 3,905,707 | 9/1975 | Feist et al. | 356/249 |
| 4,993,162 | 2/1991 | Scholian | 356/249 |
| 5,033,848 | 7/1991 | Hart et al. | 356/149 |
| 5,218,771 | 6/1993 | Redford | 33/366 |

*Primary Examiner*—K. P. Hantis
*Attorney, Agent, or Firm*—Nields, Lemack & Dingman

[57] ABSTRACT

An automatic angle compensator comprising a liquid sealing container 4 having transparent liquid to form a free liquid surface 1 sealed therein, light projecting systems 21 and 22 for projecting light at a given angle to the free liquid surface, and an optical system for guiding the light beam, which is reflected by the free liquid surface and irradiated from the liquid sealing container, whereby optical axis of the light beam reflected by the free liquid surface is aligned with optical axis of the optical system regardless of whether the free liquid surface is turned by 0° or 90°, and automatic compensation can be achieved regardless of whether the system is positioned in horizontal or vertical directions.

14 Claims, 10 Drawing Sheets

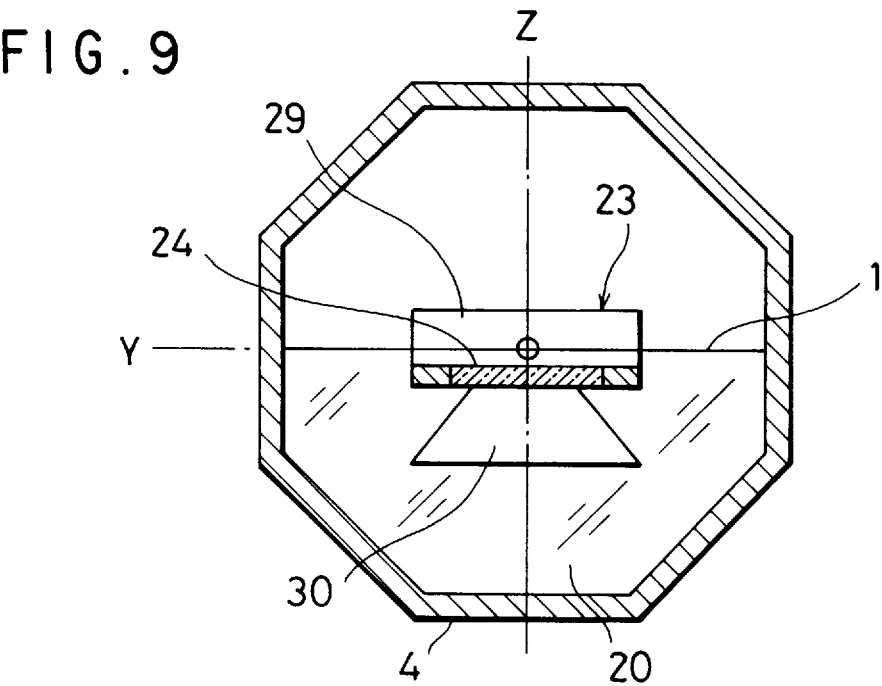
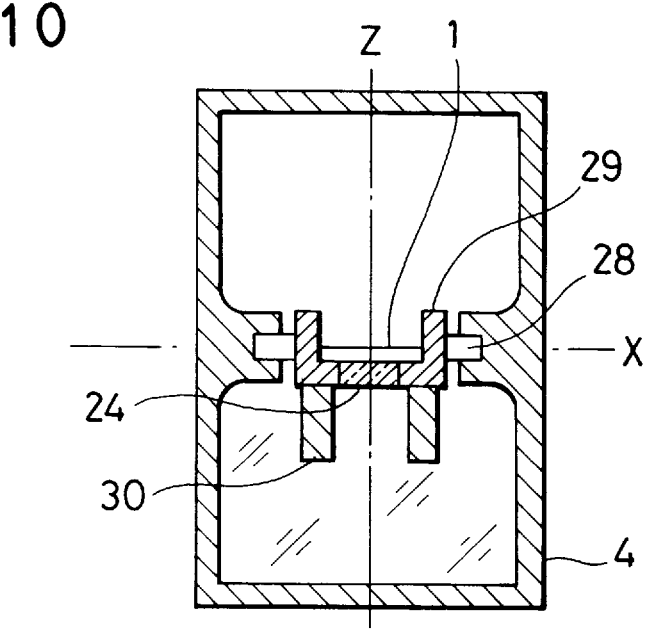

AUTOMATIC ANGLE COMPENSATOR

BACKGROUND OF THE INVENTION

The present invention relates to an automatic angle compensator, which is used for survey instruments and measuring instruments to measure the change in the amount of inclination or to maintain optical axis of the instrument in vertical or horizontal direction or to form a irradiation plane of horizontal or vertical light beam.

When various surveying operations are performed using survey instrument or measuring instrument, it is necessary to compensate reference plane of the survey or measuring instruments, or to compensate verticality of optical axis.

In the past, automatic compensators have been known, in which a pendulum of lens or prism is suspended from two or three suspension lines and, when main unit of the survey or measuring instrument is inclined, the pendulum is braked by a braking mechanism such as magnetic braking mechanism to automatically compensate optical path. Or, by utilizing back reflection of transparent liquid, optical path is automatically compensated using an optical system such as anamorphic prism so that reflected light beam will have an optical axis with the same sensitivity with respect to the change in all inclined directions of the liquid surface.

In the prior art as described above, however, the compensator can be used only when the entire system is installed approximately in horizontal or vertical directions, and it is difficult to use the compensator for both approximately horizontal and approximately vertical installing conditions. To use the compensator for the two conditions, a separately prepared optical system must be used, or a part of the optical system must be designed as replacable so that it can be replaced to suit for horizontal or vertical applications. In such cases, the reproducibility becomes low and accuracy is reduced because the optical system must be removed or assembled. Also, there is the problem of higher cost in the components.

SUMMARY OF THE INVENTION

It is an object of the present invention to provide an automatic compensator, by which it is possible to automatically compensate optical path by utilizing free liquid surface and to use the compensator for both approximately horizontal or vertical installing conditions without requiring a specially designed optical system or an additional mechanism to replace or rearrange a part of the optical system. To attain the above object, the automatic angle compensator of the present invention comprises a liquid sealing container with a transparent liquid to form a free liquid surface sealed therein, a first light projecting system for irradiating light beam at a given angle to the free liquid surface so that it is reflected by the free liquid surface, a second light projecting system arranged face-to-face to the first light projecting system with the free liquid surface therebetween and for irradiating light beam at a given angle to the free liquid surface so that the light beam is reflected by the free liquid surface when the entire system is rotated by 90°, and a profile projecting optical system for guiding and projecting the light beam reflected by the free liquid surface, or it comprises a liquid sealing container for sealing transparent liquid to form a free liquid surface sealed therein, a light projecting system for irradiating light beam at a given angle to the free liquid surface so that it is reflected by the free liquid surface, a first reflecting member for reflecting and guiding the light beam reflected by the free liquid surface when the system is inclined by 0°, a second reflecting member arranged face-to-face to the first reflecting member for reflecting and guiding the light beam reflected by the free liquid surface when the entire system is rotated by 90°, and a profile projecting optical system for projecting light beam reflected by the free liquid surface, or it comprises a liquid sealing container for sealing a transparent liquid to form a free liquid surface sealed therein, a light projecting system for irradiating light beam at a given angle to the free liquid surface so that it is reflected by the free liquid surface, a first reflecting member for reflecting the light beam reflected again by the free liquid surface toward the free liquid surface, a second reflecting member arranged face-to-face to the first reflecting member and reflecting and guiding the light beam reflected again by the free liquid surface toward the free liquid surface when the entire system is rotated by 90°, and a profile projecting optical system for guiding and projecting the light beam reflected again by the free liquid surface.

BRIEF DESCRIPTION OF THE DRAWINGS

FIG. 9 is a front view of a liquid sealing container provided with a liquid movement preventing device and used for the present invention;

FIG. 10 is a cross-sectional side view of the liquid sealing container provided with the liquid movement preventing device;

DETAILED DESCRIPTION OF THE PREFERRED EMBODIMENTS

Figure 1:
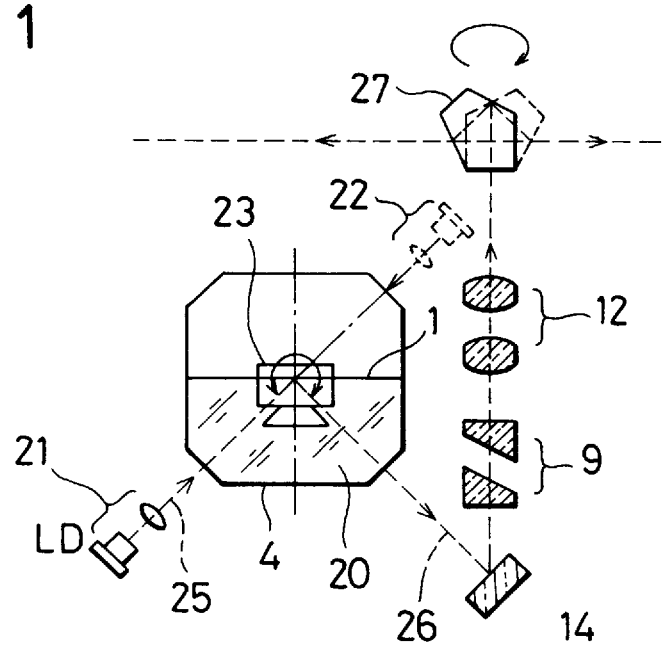
FIG. 1 is a drawing for explaining a first embodiment of the present invention.

In the following, description will be given on an embodiment of the present invention in connection with the drawings.

In case light beam is irradiated to a free liquid surface at a given angle and it is totally reflected by the free liquid surface, sensitivity of change in reflection angle varies according to inclined direction of the liquid surface when the free liquid surface is relatively inclined with respect to the light beam.

First, description will be given to a compensator, which comprises an optical system to equalize the sensitivity of change in reflection angle of the reflection optical axis in all directions and a beam expander for angular magnification adjustment, both arranged at predetermined positions on the reflection optical axis, and which can maintain the reflection optical axis in a constant direction regardless of inclination of the entire system.

In case light beam is irradiated to a free liquid surface at a given angle and it is totally reflected by the free liquid surface, sensitivity of the change in reflection angle according to inclined direction of the liquid surface when the free liquid surface is relatively inclined with respect to the light beam. This is explained, referring to FIG. 14 and FIG. 15.

In fact, the free liquid surface is maintained in horizontal direction and the direction of incident varies, while it is assumed that the direction of incident light beam is constant and that the free liquid surface is inclined to simplify the following explanation.

In the figures, reference numeral 1 represents a free liquid surface, and it is supposed that an incident light beam 2 enters the free liquid surface at an angle of $\theta$. It is further supposed that the free liquid surface 1 approximately agrees with a x-z coordinate plane formed by coordinate axes x and z and that a coordinate axis perpendicular to the coordinate plane is y. It is also supposed that optical axis of the incident light beam 2 is present in a coordinate plane, which is formed by the coordinate axis z and the coordinate axis y. If the free liquid surface 1 is inclined by an angle $\alpha$ around the coordinate axis x from the above condition, optical axis of the reflected light beam 3 moves within the x-z coordinate plane, and reflection angle is changed by $\xi 1x$ within the y-z coordinate plane. In this case, the relation between the liquid surface displacement angle $\alpha$ and the reflection displacement angle $\xi 1x$ is given by $\xi 1x = 2\alpha$. There is no reflection displacement angle $\xi 2x$ within the x-y coordinate plane. In the figure, reference numeral 14 represents a reflecting mirror.

Figure 15:
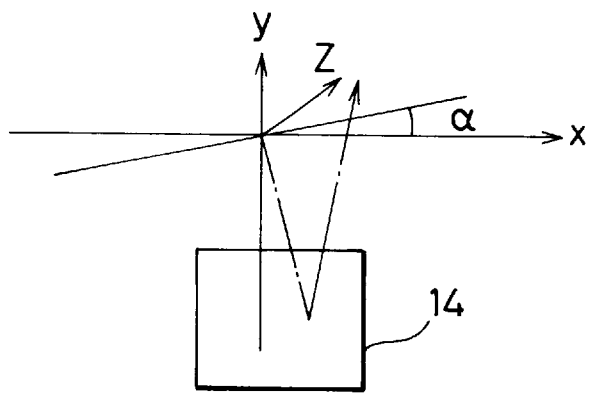
FIG. 15 is a drawing for explaining change of reflection angle of the reflected light beam in case the free liquid surface is inclined.

In contrast, if the free liquid surface 1 is inclined by an angle $\alpha$ around the coordinate axis z as shown in FIG. 15, the reflected light beam 3 is separated and moved from each of the x-Y coordinate plane and the y-z coordinate plane. Therefore, a reflection displacement angle $\xi 1z$ and a reflection displacement angle $\xi 2x$ appear on the x-y coordinate plane and the y-z coordinate plane respectively. Further, the relation between the reflection displacement angle $\xi 1z$ and the liquid surface displacement angle $\alpha$ of the free liquid surface 1 is given by:

$$\xi 1z = \cos^{-1}(\cos^2\theta \cos 2\alpha + \sin^2\theta)$$

$$\xi 2z = 90° - \cos^{-1}((1-\cos 2\alpha)\sin\theta \cos\theta) \quad (1)$$

For example, if it is supposed that $\alpha = 10'$ and $\theta = 50°$, $\xi 2z = 1.7''$, the value of $\xi 2z$ is negligible in terms of accuracy. Further, if it is supposed that refractive index of the liquid is n, optical axis after passing through the liquid is given by:

$$\xi 1x' = 2n\alpha$$

$$\xi 1z' = n\Omega\cos^{-1}(\cos^2\theta \cos 2\alpha + \sin^2\theta) \quad (2)$$

Therefore, sensitivity to the liquid surface displacement angle $\alpha$ varies between the reflection displacement angle $\xi 1x'$ and the reflection displacement angle $\xi 1z'$. The difference of the sensitivity between the reflection displacement angle $\xi 1x'$ and the reflection displacement angle $\xi 1z'$ is compensated by optical means to equalize the sensitivity. As a result, it is possible to obtain an optical axis, which is deflected always at a given ratio with respect to all directions.

Further explanation will be given referring to FIG. 16.

In this figure, reference numeral 4 represents a liquid sealing container provided on main unit of an instrument such as a survey instrument, and a free liquid surface 1 is formed by the liquid sealed in the liquid sealing container 4. A light beam emitted from a light source 6 is projected at a given angle via a collimator lens 5 toward the free liquid surface 1 so that it is totally reflected, and optical axis of the light beam is positioned within the y-z coordinate plane as already described.

With the free liquid surface 1 not inclined, an anamorphic prism system 9 is arranged, which comprises a pair of wedge-like prisms 7 and 8 along optical axis of the reflected light beam 3, which has been totally reflected by the free liquid surface 1.

After passing through the anamorphic prism system 9, the light beam is reflected by a reflecting mirror 14 in vertical direction, and the light beam reflected by the reflecting mirror 14 passes through a beam expander 12, which comprises convex lenses 10 and 11. If it is supposed that focal length of the convex lens 10 is f3 and focal length of the convex lens 11 is f4, the distance between the convex lenses 10 and 11 is set to f3+f4.

The anamorphic prism system 9 may be arranged in the optical path after light beam has been reflected by the reflecting mirror 14.

Figure 16:
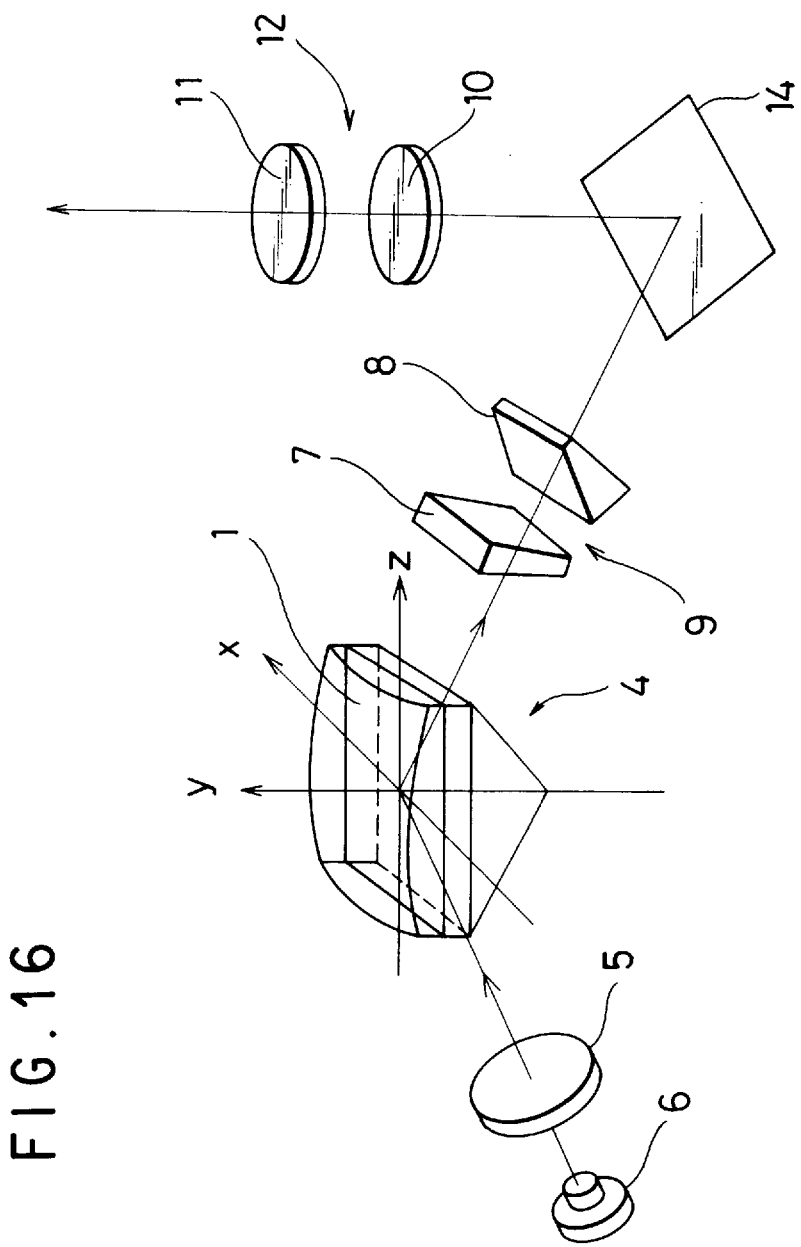
FIG. 16 is a drawing for explaining automatic angle compensation in case the light beam is reflected once by the free liquid surface.

When it is supposed in FIG. 16 that the preset incident angle $\alpha$ to liquid is 45°, inclination angle $\alpha$ of the instrument, i.e. inclination angle of the free liquid surface 1, is 10", and refractive index n of the liquid is 1.5, the reflection displacement angle $\xi 1x'$ in case the free liquid surface 1 is inclined around x axis and the reflection displacement angle $\xi 1z'$ in case the free liquid surface 1 is inclined around z axis are given by the equation (2) as:

$$\xi 1x' = 30'', \text{ and } \xi 1z' = 21.213'.$$

Therefore, the difference of sensitivity between the reflection displacement angle $\xi 1x'$ and the reflection displacement angle $\xi 1z'$ is:

$$(\xi 1x'/\xi 1z') = 1.414.$$

Thus $$\xi 1x'=2n\alpha, \quad \xi 1z'=1.414n\alpha$$

$$\xi 1x'/\xi 1z'=1.414 \quad (3)$$

Next, the above sensitivity difference is optically compensated by the anamorphic prism system 9.

Figure 17:
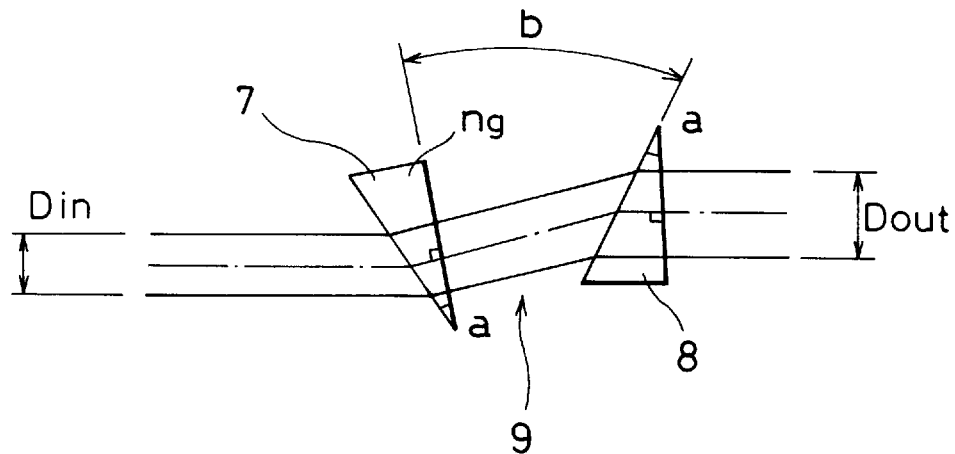
FIG. 17 is a drawing for explaining change of optical axis of the transmitted light beam with respect to anamorphic prism system.
Figure 18A:
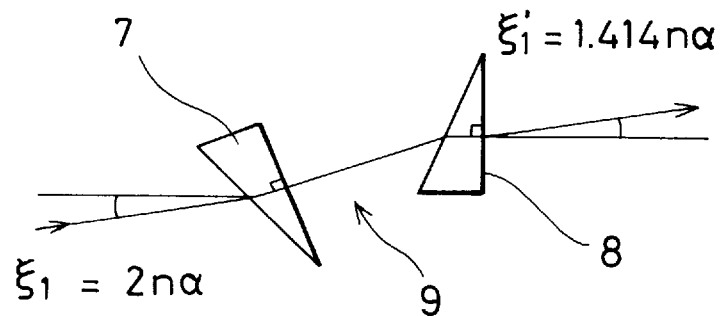
FIG. 18 (A) and FIG. 18 (B) each represents a drawing to show change of optical axis of the transmitted light beam with respect to an anamorphic prism system.
Figure 18B:
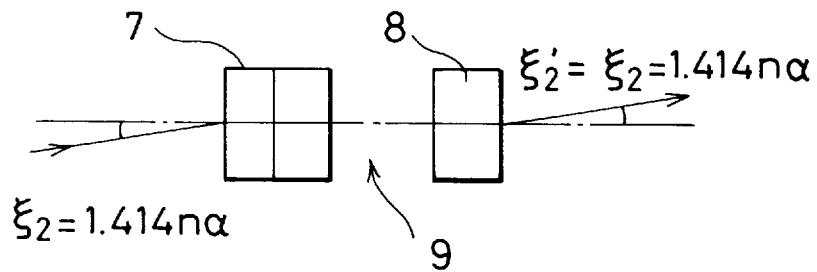

Now, description is given on the anamorphic prism system 9 referring to FIG. 17 and FIG. 18.

It is supposed that vertical angles of the wedge-like prisms 7 and 8, which constitute the anamorphic prism system 9, are a7 and a8 respectively, that relative angle between the wedge-like prisms 7 and 8 is b, that refractive index is ng, that incident light beam is Din and outgoing light beam is Dout, and that the wedge-like prisms 7 and 8 are identical with each other and vertical angles of these prisms are a=a7=a8. Then, $$\text{Magnification } Map=(Din/Dout)=\cos^2 a/(1-ng^2 \cdot \sin^2 a) \quad (4)$$

Therefore, angular magnification is approximately 1/Map. To satisfy the relation:

$$Map=2n\alpha/1.414n\alpha=1.414 \quad (5),$$

it is supposed that vertical angle of the prism is a, relative angle of the wedge-like Prisms 7 and 8 is b, and refractive index ng are adequately selected (e.g. a=25.559°, and b=40.653° if ng=1.51). Then, the value of ξ1x' after passing through the anamorphic prism system 9 is converted to: 2nα×1.414 nα/2nα=1.414 nα, and ξ1x'=ξ1z' after passing through the anamorphic prism system 9.

After passing the anamorphic prism system 9, optical axis of the reflected light beam 3 always has a uniform reflection displacement angle with respect to inclination of the free liquid surface 1 in all directions. Even when the free liquid surface 1 is inclined in any direction, it is possible to always obtain reflection displacement angle with the same sensitivity with respect to the inclination of the free liquid surface 1.

Further, after passing through the anamorphic prism 9 and being reflected upward by the reflecting mirror 14, the light beam passes through the beam expander 12. In this case, if angular magnification of the beam expander 12 is 1/1.414n, the optical axis after transmitting is inclined by:

$$(\xi 1x'=\xi 1z'=1.414n\alpha)\times 1/1.414n=\alpha \quad (6),$$

and final optical axis after passing through the beam expander 12 always runs perpendicularly to the free liquid surface 1, i.e. it is maintained in vertical condition. If it is supposed that focal length of the convex lens 10 of the beam expander 12 is f3 and focal length of the convex lens 11 is f4, angular magnification Mex of the beam expander 12 is f3/f4. Accordingly, by selecting the values of f3 and f4, angular magnification Mex can be set to 1/1.414n.

Next, in the embodiment shown in FIG. 16, the values of vertical angles a7 and a8 of the wedge-like prisms 7 and 8, relative angle b of the wedge-like prisms 7 and 8, and refractive index ng may be adequately selected so that the anamorphic prism system 9 may be rotated by 90° and M=1/1.414.

The anamorphic prism system 9 in the above optical system is generally used for the purpose of changing the beam of elliptical shape to circular shape. For example, in case a laser diode is used as the light source, cross-sectional shape of the light beam can be made closer to circular shape by means of the anamorphic prism system 9. (Beam of laser diode is in elliptical shape.)

In general, instrument or device with such a laser diode incorporated in it often serves as a laser pointer or a laser marker, and it is desirable that the shape of the irradiated beam is closer to circular shape. Therefore, the compensation of optical axis using the anamorphic prism system 9 is very effective to obtain the beam in circular shape.

As described above, it is possible to obtain optical axis, which is constantly deflected at a constant ratio with respect to all directions by means of compensating the difference of sensitivity of displacement angles between the reflection displacement angle ξ1x' and the reflection displacement angle ξ1x' with respect to the liquid surface displacement angle by optical means and equalizing the sensitivity.

Next, referring to FIG. 19 and FIG. 20, description will be given on the difference of sensitivity of change in the reflection angle in case the light beam is irradiated at a given angle to a free liquid surface and is totally reflected on the free liquid surface, the emitted light beam is reflected by a reflecting member such as a mirror and is again irradiated to the free liquid surface and is totally reflected by the free liquid surface, and also the case where the light beam is totally reflected twice by the free liquid surface with respect to inclined direction of the liquid surface when the free liquid surface is relatively inclined with respect to the light beam.

Figure 14:
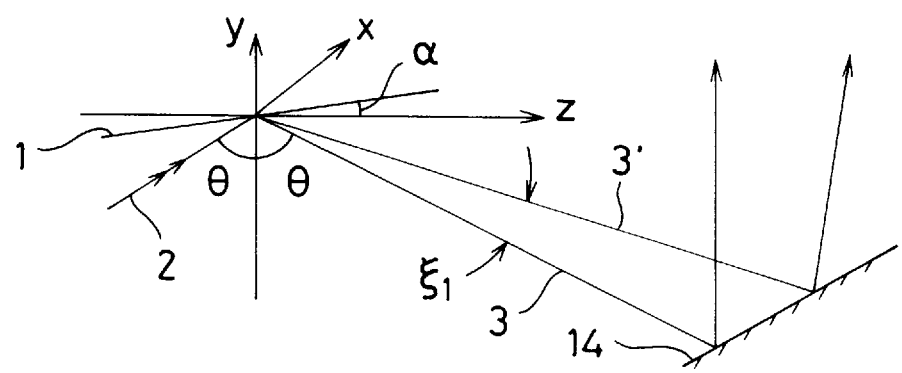
FIG. 14 is a drawing for explaining change of reflection angle of the reflected light beam in case the free liquid surface is inclined.
Figure 19:
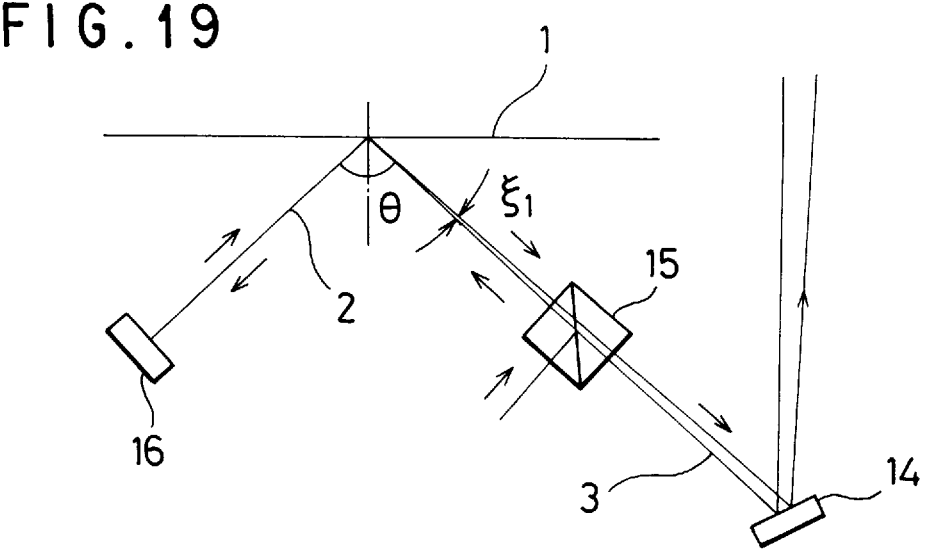
FIG. 19 is a drawing for explaining change of reflection angle of the reflected light beam in case it is reflected twice by the free liquid surface.
Figure 20:
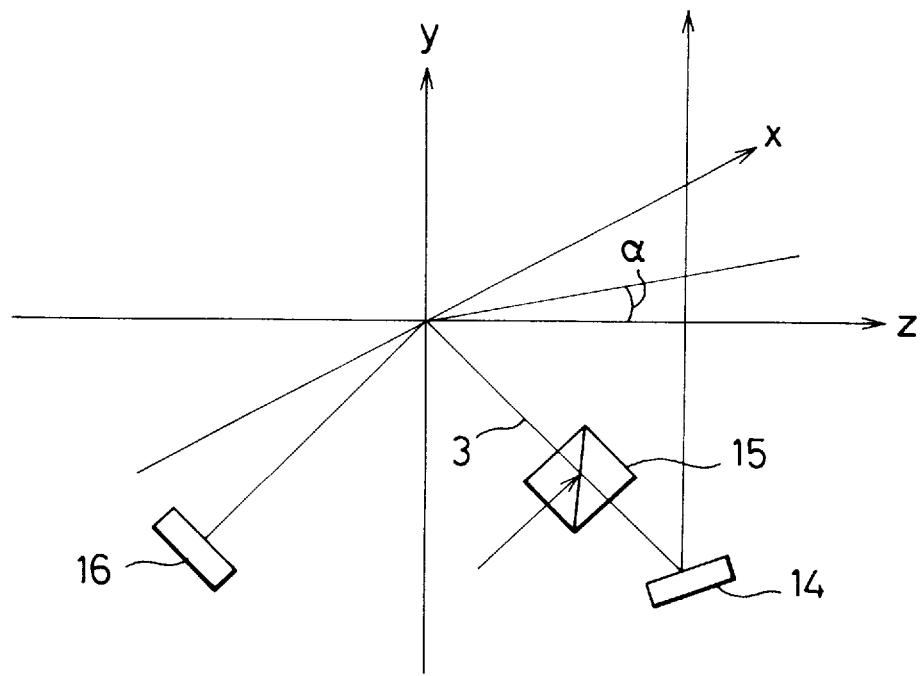
FIG. 20 is a drawing for explaining change of reflection angle of the reflected light beam when the free liquid surface is inclined in case the light beam is reflected twice by the free liquid surface.

In FIGS. 19 and 20, the same component as in FIGS. 14 and 15 is referred by the same symbol.

Description is given on the case where incident light beam 2 reflected by a beam splitter 15 enters the free liquid surface 1 at an angle of θ and is totally reflected by the free liquid surface 1, and it is again reflected by a reflection mirror 16 and enters again the free liquid surface 1, and is totally reflected by the free liquid surface 1, and passes through the beam splitter 15 and is reflected by the reflecting mirror 14.

It is assumed that the x-z coordinate plane formed by coordinate axes x and z are approximately agrees with the free liquid surface 1, and that coordinate axis perpendicular to the above coordinate plane is y. It is also assumed that optical axis of the incident light beam 2 is present within a coordinate plane formed by the coordinate axes z and y. If the free liquid surface 1 is inclined by an angle α around the coordinate axis x from the above condition, optical axis of the reflected light beam 3 is moved within the y-z coordinate plane, and the reflection angle is changed by ξ1x within the y-z coordinate plane. In this case, the relation between the liquid surface displacement angle α and the reflection displacement angle ξ1x is given by ξ1x=4α, and there is no reflection displacement angle ξ2x within the x-y coordinate plane.

In contrast, if the free liquid surface 1 is inclined by an angle α around the coordinate axis z as shown in FIG. 20, the reflected light beam 3 is separated and moved from each of the x-y coordinate plane and the y-z coordinate plane. Therefore, the reflection displacement angle ξ1z and the reflection displacement angle ξ2z appear on the x-y coordinate plane and the y-z coordinate plane respectively. Further, the relation between the reflection displacement angle ξ1z and the liquid surface displacement angle α of the free liquid surface 1 is given by:

$$\xi 1z=\cos^{-1}\{\cos 2\alpha \cdot \sin^2 2\theta - \cos 2\theta \cdot \sin^2 \theta - (\sin^2 2\alpha - \cos^2 2\alpha \cdot \cos 2\theta)\cos^2 \theta\}$$

$$\xi 2z=90°-\cos^{-1}[\{½(\sin^2 2\alpha-\cos^2 2\alpha\cdot\cos 2\theta-\cos 2\theta)+\cos 2\alpha\cdot\cos 2\theta\}\sin 2\theta] \quad (7)$$

For example, if it is supposed that $\alpha=10'$ and $\theta=45°$, $\xi 2z=3.49''$, the value of $\xi 2z$ is negligible in terms of accuracy. Further, if it is supposed that refractive index of the liquid is n, an optical axis of the light beam after light beam passing through the liquid is given by:

$$\xi 1x'=n\xi 1x$$

$$\xi 1z'=n\xi 1z \quad (8)$$

More concretely, if $\alpha=10'$, $\theta=45°$, and $n=1.5$, $$\xi 1x'=60'$$

$$\xi 1z' = n\cos^{-1}\{\cos 2\alpha - 1/2(\sin^2 2\alpha)\}$$
$$= 42.426'$$

$$\xi 1x'/\xi 1z'=1.414 \quad (9)$$

Thus, when $\theta=45°$, the difference of sensitivity to the liquid surface displacement angle $\alpha$ with respect to the reflection displacement angle $\xi 1x'$ and the reflection displacement angle $\xi 1z'$ is the same as the difference in case the light beam is reflected once by the free liquid surface 1. Therefore, the anamorphic prism system 9 can be used, which makes it possible to obtain reflection displacement angle of the same sensitivity to the inclination.

Here, angular magnification Map of the anamorphic prism system 9 is given by:

$$\text{Map}=4n\alpha/2.829n\alpha=1.414$$

$$1/\text{Map}=\gamma\text{ap}=1/1.414=0.70721 \quad (10)$$

Therefore, when the light beam passes through the anamorphic prism system 9, its optical axis is compensated as:

$$\xi 1x'=4n\alpha\times 1/1.414=2.829n\alpha$$

$$\xi 1z'=2.829n\alpha \quad (11)$$

Further, if it is supposed that $n=1.5$, magnification Mex of the beam expander 12, which is provided to maintain optical axis of light beam in vertical direction after light beam passes through the anamorphic prism system 9, may be given by:

$$\text{Mex}=2.829n\alpha/\alpha=2.8290n=4.244$$

$$\gamma\text{ex}=1/\text{Mex}=1/2.829n=0.236 \quad (12)$$

As described above, it is possible to obtain optical axis, which is constantly deflected at a constant ratio with respect to all directions by means of the difference of sensitivity of displacement angles between the reflection displacement angle $\xi 1x'$ and the reflection displacement angle $\xi 1z'$ with respect to the liquid surface displacement angle by optical means and equalizing the sensitivity.

In the following, description will be given on embodiments of the present invention provided with an automatic angle compensator as described above.

FIG. 1 represents a first embodiment of the present invention. A liquid sealing container 4 with transparent liquid 20 sealed in it is provided. Also, there are provided a first light projecting system 21, which has an optical axis to irradiate light beam 25 to the free liquid surface 1 of the transparent liquid 20 in horizontal direction and at an angle of 45°, and a second light projecting system 22, which is arranged face-to-face to the first light projecting system 21 with the liquid sealing container 4 therebetween on the same optical axis as that of the first light projecting system 21.

A liquid movement preventing device 23 is arranged inside the liquid sealing container 4. The liquid movement preventing device 23 has its rotating center at the point where optical axis of the first light projecting system 21 crosses the transparent liquid 20. As described later, the liquid movement preventing device 23 has a transparent liquid movement preventing plate 24 at a position a little below the free liquid surface 1 of the transparent liquid 20, and it is freely movable in order to keep the liquid movement preventing plate 24 always in horizontal position. After entering the liquid sealing container 4, the light beam 25 from the first light projecting system 21 passes through the transparent liquid 20 and the liquid movement preventing plate 24. It is then totally reflected by the liquid surface of the transparent liquid 20, passes through the liquid movement preventing plate 24 and the transparent liquid 20 and is emitted out of the liquid sealing container 4.

The light beam 26 reflected by the free liquid surface 1 of the transparent liquid 20 is reflected by a reflecting mirror 14 toward vertical direction. Along optical path of the light beam 26 reflected by the reflecting mirror 14, an anamorphic prism system 9, a beam expander 12 and a pentagonal prism 27 are arranged. The pentagonal prism 27 is freely rotatable and emits the reflected light beam 26 in horizontal direction.

As described above, the anamorphic prism system 9 equalizes reflection sensitivity in all directions, and the beam expander 12 ultimately adjusts the sensitivity. Therefore, after passing through the beam expander 12, optical axis of the light beam is always compensated in vertical direction regardless of inclination of the entire system. Accordingly, by rotating the pentagonal prism 27, it is possible to obtain a constant horizontal reference plane at all times. In other words, the present invention can be applied as a leveling instrument.

Figure 2:
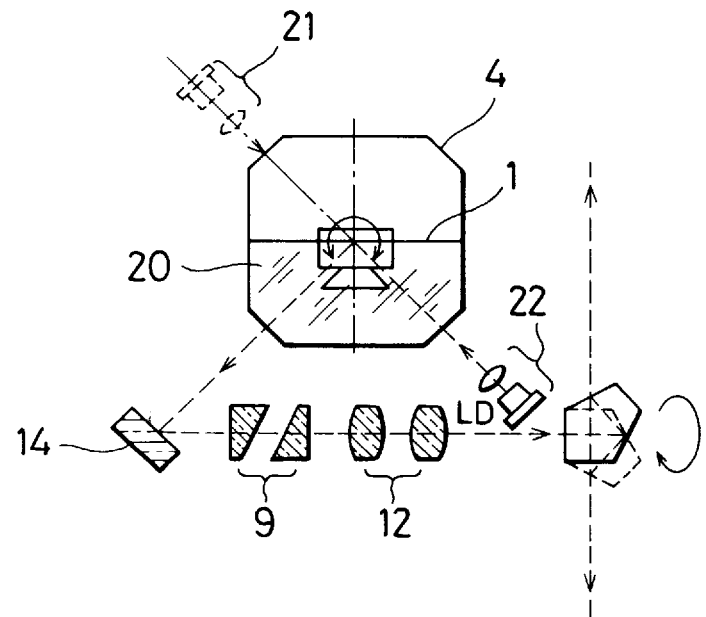
FIG. 2 is a drawing for explaining the first embodiment when it is rotated by 90 degrees.

Next, FIG. 2 represents the case where the entire system is rotated by 90°.

The liquid movement preventing device 23 is rotated by 90° so that the liquid movement preventing plate 24 is kept at horizontal position. Because the free liquid surface 1 of the transparent liquid 20 is kept in horizontal direction with respect to the center of gravity, it follows the angle of 90° of the entire system and is rotated by 90°.

The light beam coming from the second light projecting system 22 is totally reflected by the free liquid surface 1 of the transparent liquid 20, and optical axis of the reflected light beam runs along the same optical axis as the emitting optical axis before turned by 90°, optical axis of the light beam passing through the beam expander 12 is always kept in horizontal direction. By rotating the pentagonal prism 27, the irradiated reference plane is converted toward vertical direction, and it is possible to obtain a constant vertical reference plane regardless of inclination of the entire system.

The transparent liquid 20 sealed in the liquid sealing container 4 is moved by external vibration, while this movement is suppressed by the liquid movement preventing device 23.

Figure 11:
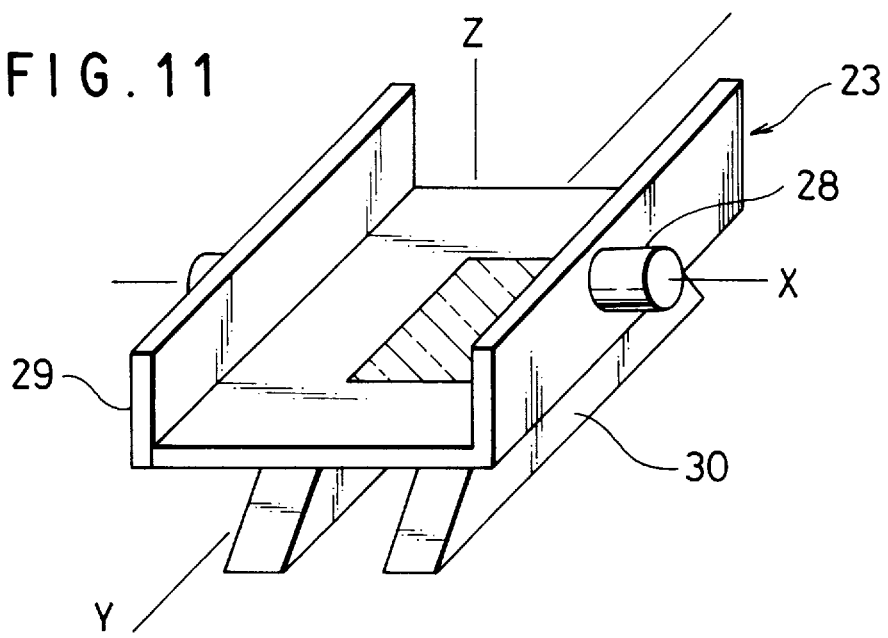
FIG. 11 is a perspective view of the liquid movement preventing device.

Referring to FIGS. 9 to 11, description is now given on the liquid movement preventing device 23 together with the liquid sealing container 4.

In the liquid sealing container 4 with regular octagonal shape, the transparent liquid 20 is sealed, and the liquid movement preventing device 23 having rotating center in the free liquid surface 1 of the transparent liquid 20 is provided via a pendulum shaft 28. The liquid sealing container 4 comprises a transparent member made of a material such as glass, or at least a part of the liquid sealing container 4, which the light beam enters through and emits light beam, comprises a transparent member.

The liquid movement preventing device 23 comprises a moving frame 29 with concave cross-section with the pendulum shaft 28 protruding from it and a pair of trapezoidal weights 30 suspended from lower surface of the moving frame 29. At the middle portion of the moving frame 29, a transparent plate to pass the light beam, i.e. the liquid movement preventing plate 24 made of glass plate, not to attenuate the light, is inserted. The liquid movement preventing plate 24 and upper surface of the moving frame 29 are on the same level, and the upper surface of the liquid movement preventing plate 24 is a little below the free liquid surface 1.

The center of gravity of the liquid movement preventing device 23 is below the liquid movement preventing plate 24, and the surface of the liquid movement preventing plate 24 is maintained at horizontal position regardless of the posture of the liquid sealing container 4.

After entering the liquid sealing container 4, the light beam passes through the transparent liquid 20 and the liquid movement preventing plate 24 and it is totally reflected by the free liquid surface 1. Then, it passes through the liquid movement preventing plate 24 and the transparent liquid 20 again and goes out of the liquid sealing container 4.

When natural frequency of the liquid movement preventing device 23 is set to a value lower than natural frequency of the transparent liquid 20 sealed in the liquid sealing container 4, the movement of the free liquid surface 1 is suppressed by viscosity of the liquid and resistance of the liquid movement preventing plate 24. Because the center of rotation of the liquid movement preventing device 23 is at the reflection point of the light beam on the free liquid surface 1, the same condition can be maintained even in case the liquid sealing container 4 is rotated by 90°. If the light beam enters from the opposite direction as described above, the light beam is reflected in the same direction.

Thus, angle compensation can be achieved when the automatic angle compensator is at both horizontal and vertical positions.

Here, incident angle of the light beam from the first light projecting system 21 and the second light projecting system 22 to the free liquid surface 1 is approximately 45°. Thus, to totally reflect the light beam, refractive index of the liquid must be about 1.4 or more. A part of the reflected light may be utilized without reflecting totally. Also, the liquid movement preventing plate 24 and upper surface of the moving frame 29 may not be on the same level, and the weights 30 are not limited to trapezoidal shape and may be designed in rectangular, circular or other shapes. It is needless to say that the reflecting mirror 14 may be replaced with other type of reflecting member such as a prism.

Figure 3:
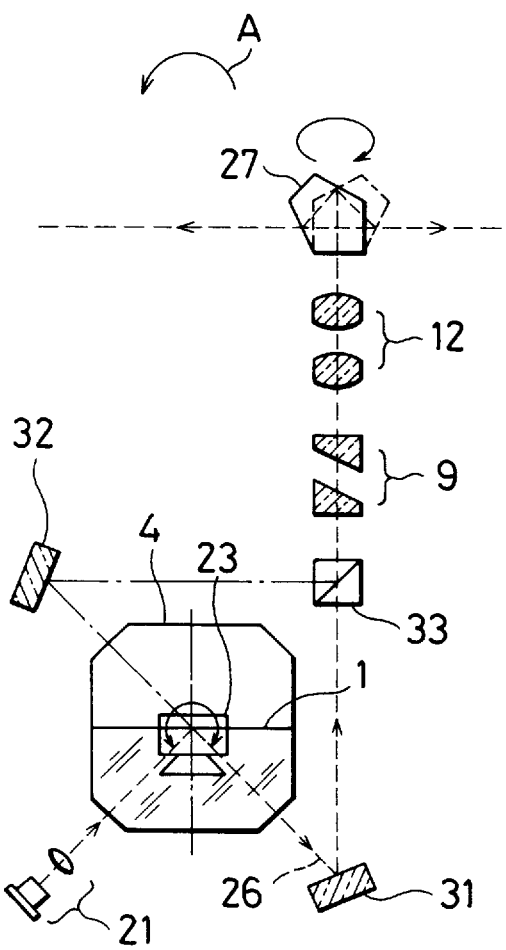
FIG. 3 is a drawing for explaining a second embodiment of the present invention.

Description is now given on a second embodiment of the present invention, referring to FIG. 3.

There are provided a first light projecting system 21, which has an optical axis to irradiate light beam 25 to the free liquid surface 1 of the transparent liquid 20 sealed in the liquid sealing container 4 at an angle of 45° with respect to horizontal direction, and a first reflecting mirror 31 and a second reflecting mirror 32 arranged on an optical axis which runs perpendicularly to the optical axis of the light beam 25 and at symmetrical positions with the liquid sealing container 4 therebetween.

The first reflecting mirror 31 reflects the reflected light beam 26, coming from the liquid sealing container 4, toward vertical direction, and the second reflected mirror 32 reflects the reflection light beam 26, coming from the liquid sealing container 4, in a direction perpendicular to the reflection optical axis of the reflected light beam from the first reflecting mirror 31. A beam splitter 33 is arranged at a position where the reflected light beam from the second reflecting mirror 32 crosses the reflected light beam from the first reflecting mirror 31. The light beam coming from the first reflecting mirror 31 passes through the beam splitter 33, and the reflected light beam coming from the second reflecting mirror 32 is reflected in such manner that it is aligned with the optical axis of the reflected light beam from the first reflecting mirror 31. On optical path of the light beam irradiated from the beam splitter 33, an anamorphic prism system 9, a beam expander 12 and a pentagonal prism 27 are arranged one after another.

When the entire system is aligned in vertical direction, the light beam 26 reflected by the free liquid surface 1 is reflected in vertical direction by the first reflecting mirror 31 as shown in FIG. 3 and is compensated in vertical direction by the anamorphic prism 9 and the beam expander 12 and is further turned to horizontal direction by the pentagonal prism 27. By rotating the pentagonal prism 27, it is possible to obtain horizontal rotating irradiation plane.

Although not shown in the figure, if the entire system is turned by 90° in the direction of the arrow A in FIG. 3, the free liquid surface 1 is also rotated by 90°, and the light beam 26 reflected by the free liquid surface 1 is reflected further by the second reflecting mirror 32 and the beam splitter 33, and it passes through the anamorphic prism system 9 and the beam expander 12 and is compensated to horizontal light beam. By rotating the pentagonal prism 27, it is possible to obtain vertical rotating irradiation plane.

It is needless to say that the first reflecting mirror 31 and the second reflecting mirror 32 can be replaced with the other reflecting means such as a prism.

Also, it is possible to perform angle compensation in the second embodiment when the automatic angle compensator is at horizontal or vertical positions.

In the two embodiments as described above, inclination is compensated similarly in all directions in case rotating irradiation plane of light beam is formed on horizontal plane and the case where it is formed on vertical plane. However, in case it is formed on vertical plane, angular compensation with respect to horizontal angle direction is not practically necessary in strict sense of the word. There is no practical problem when the system itself is rotated and used.

Figure 4:
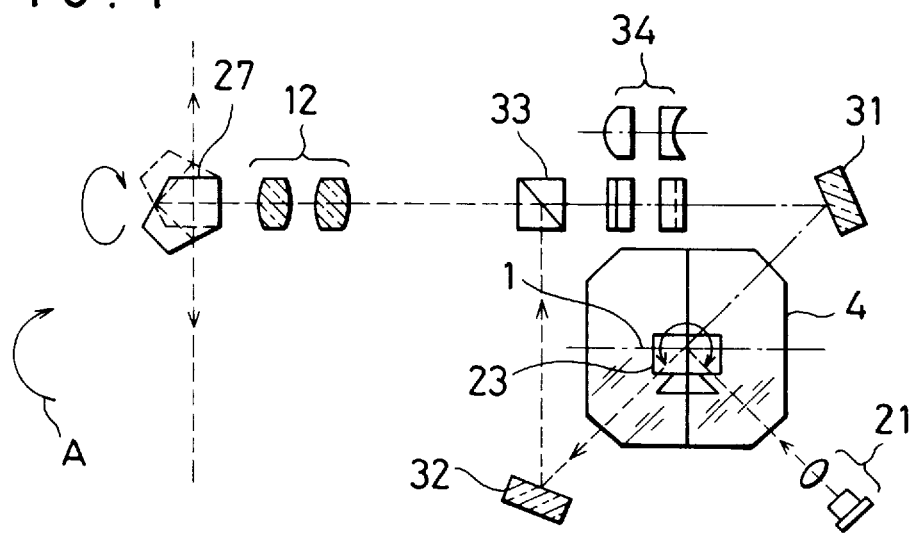
FIG. 4 is a drawing for explaining a third embodiment of the present invention.

FIG. 4 represents a third embodiment of the invention. From the second embodiment shown in FIG. 3, the anamorphic prism system 9 is removed, and cylindrical lenses 34 are arranged between the first reflecting mirror 31 and the beam splitter 33. Specifically, the cylindrical lenses 34 for equalizing reflection sensitivity on the free liquid surface 1 in all directions are incorporated only on the optical path where the reflected light beam 26 is irradiated in vertical direction, and the sensitivity is ultimately adjusted by the beam expander 12 to obtain an optical axis with vertical line compensated at all directions. Thus, by rotating the pentagonal prism 27, the irradiated light beam plane can be maintained in horizontal direction at all times.

Further, when the third embodiment is turned by 90° to the condition as shown in FIG. 4, the light beam reflected by the free liquid surface 1 is adjusted, with respect to inclination of the entire system, in its magnification by the beam expander 12 and is compensated in horizontal direction, while it is deflected at a small angle in horizontal angle direction. Therefore, the light beam plane rotated and irradiated by the rotating pentagonal prism 27 can be always maintained in vertical direction, but the angle in horizontal direction of the vertical plane is not compensated. However, to the deflection in horizontal angle direction as described above, it will suffice to rotate the entire system and there is practically no problem. Thus, the arrangement can be reduced because it is possible by the present invention to arrange an optical system which equalizes reflection sensitivity on the free liquid surface 1 only on one optical axis as shown in the third embodiment.

Figure 5:
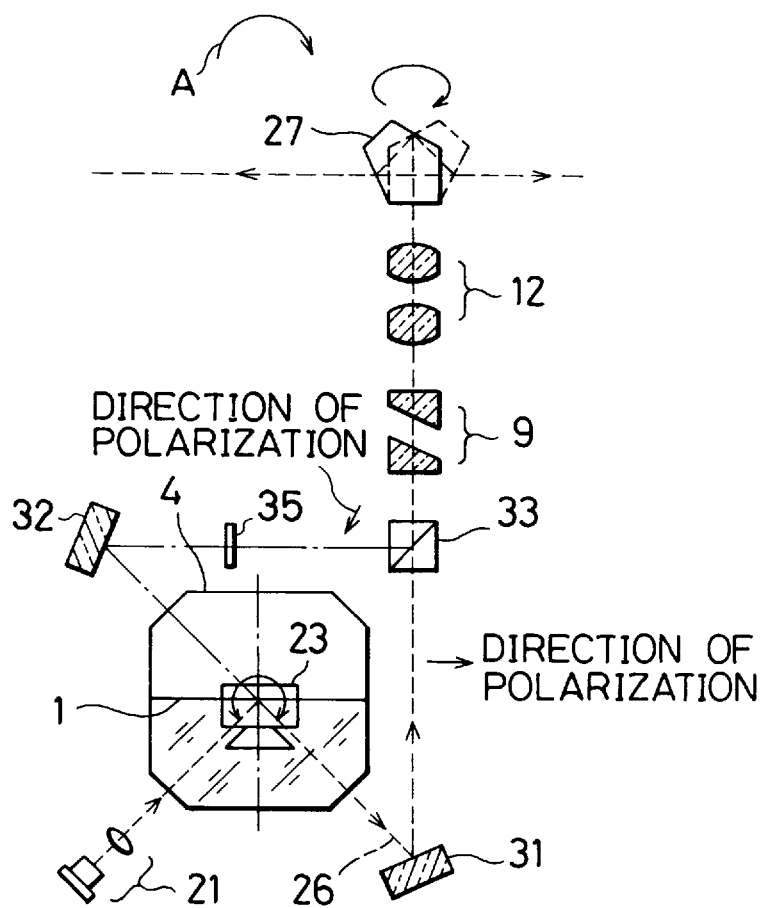
FIG. 5 is a drawing for explaining a fourth embodiment of the present invention.

FIG. 5 shows a fourth embodiment of the invention. A light source emitting linearly polarized light such as semiconductor laser is used as the light source so that the light beam emitted from the light projection system 21 is turned to linearly polarized light parallel to the paper surface. A birefringence member, e.g. a ½ wave plate 35, to change direction of polarization of the light beam is arranged either between the first reflecting mirror 31 and the beam splitter 33 or between the second reflecting mirror 32 and the beam splitter 33 (in FIG. 5, between the second reflecting mirror 32 and the beam splitter 33), and the direction of polarization of the reflected light beam from the second reflecting mirror 32 is changed to a direction perpendicular to direction of polarization of the light beam coming from the first reflecting mirror 31.

The beam splitter 33 is designed as a polarized light beam splitter having polarizing property so that it reflects the light beam of polarized light component perpendicular to the paper surface and transmits the light beam of polarized light component in parallel to the paper surface. Consequently, the beam splitter 33 passes the light beam from the first reflecting mirror 31 through and reflects the light beam passing through the ½ wave plate 35, after reflected by the second reflecting mirror 32 and the two reflection light beams can be united on the same optical axis.

As described above, by changing the two directions of polarization, it is possible to suppress attenuation of light on the beam splitter 33 as much as possible and to efficiently align optical axes of the two reflection light beams.

Figure 6:
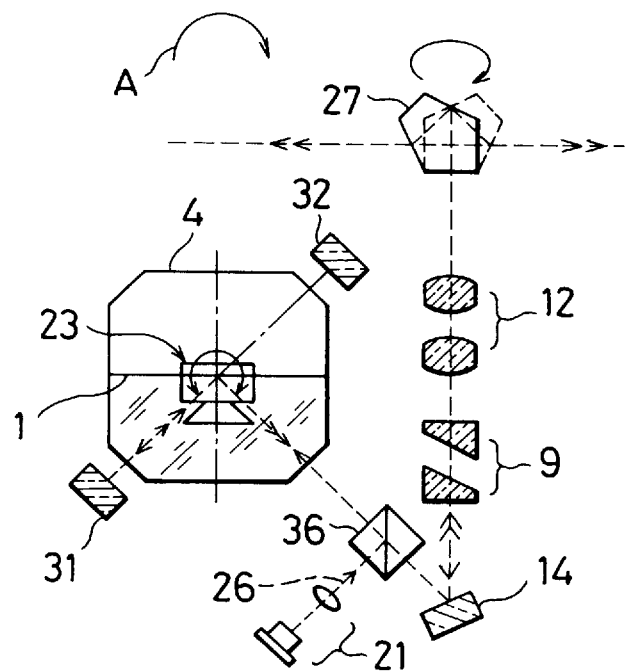
FIG. 6 is a drawing for explaining a fifth embodiment of the present invention.

FIG. 6 represents a fifth embodiment of the invention.

There are provided a first light projecting system 21, which has an optical axis to irradiate the light beam 25 to the free liquid surface 1 of the liquid sealing container 4 via a beam splitter 36 in horizontal direction and at an angle of 45°, and a first reflecting mirror 31 and a second reflecting mirror 32 arranged on an optical axis which runs perpendicularly to incident optical axis of the light beam 25 and at symmetrical positions with the liquid sealing container 4 therebetween.

When the entire system is in the position as shown in FIG. 6, the reflected light beam 26 coming from the first light projecting system 21 is reflected by the beam splitter 36, enters the free liquid surface 1 at an angle of 45°, and is further totally reflected. It is then reflected by the first reflecting mirror 31, is totally reflected by the free liquid surface 1 again, and passes through the beam splitter 36.

After totally reflected twice by the free liquid surface 1 and passing through the beam splitter 36, the light beam is reflected in vertical direction by the reflecting mirror 14. On the optical path of the light beam reflected by the reflecting mirror 14, an anamorphic prism system 9 and a beam expander 12 are arranged.

By the anamorphic prism system 9 and the beam expander 12, reflection sensitivity on the free liquid surface 1 is equalized in all directions. In case the light beam is reflected twice by the free liquid surface 1, if the incident angle is 45°, sensitivity can be equalized in all directions similarly to the case where light beam is reflected once by the free liquid surface 1. Thus, it is possible to obtain optical axis, which is compensated in vertical direction regardless of the inclination of the entire system.

After passing through the beam expander 12, the light beam is irradiated in horizontal direction by the pentagonal prism 27, and by rotating the pentagonal prism 27, it is possible to obtain horizontal rotating irradiation plane at all times.

When turned by 90° in the direction of the arrow A in FIG. 6, the reflected light beam 26 from the first light projecting system 21 is reflected by the beam splitter 36. The light beam enters the free liquid surface 1, rotated by 90°, at an angle of 45°, is further totally reflected, is reflected by the second reflecting mirror 32 and totally reflected again by the free liquid surface 1, and passes through the beam splitter 36, the anamorphic prism system 9 and the beam expander 12.

By the anamorphic prism system 9 and the beam expander 12, reflection sensitivity on the free liquid surface 1 is equalized in all directions, and the light beam passing through the beam expander 12 is always maintained in horizontal direction. The rotating irradiation plane rotated and irradiated by the pentagonal prism 27 is always formed as vertical plane regardless of the inclination of the system.

It is needless to say that the liquid movement preventing device 23 in the figure suppresses the movement of the free liquid surface 1 as described already.

Figure 7:
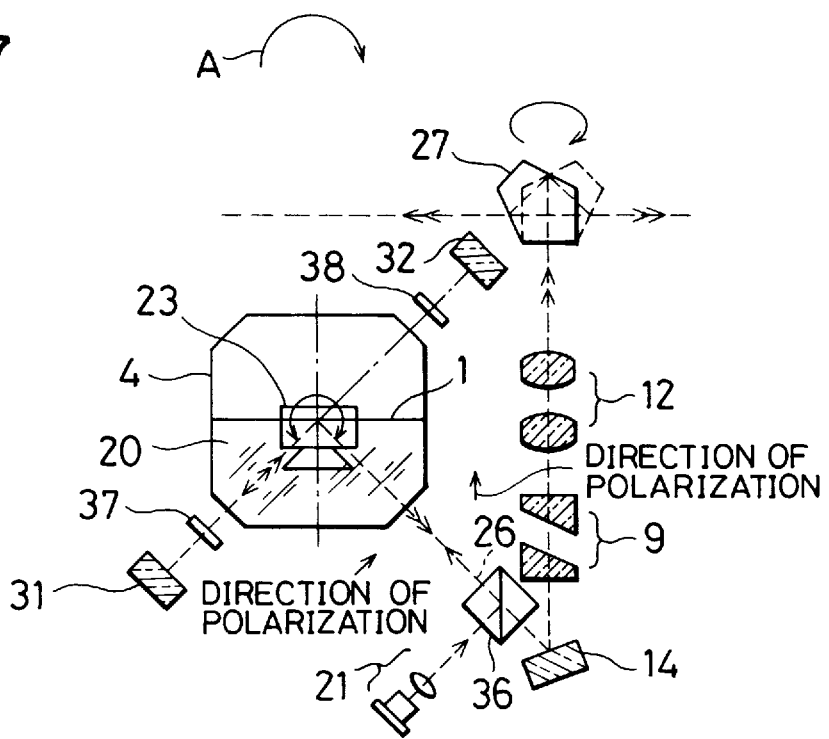
FIG. 7 is a drawing for explaining a sixth embodiment of the present invention.

FIG. 7 shows a sixth embodiment of the invention. The sixth embodiment is the same as the fifth embodiment except that a birefringence member, e.g. a ¼ wave plate 37, to change direction of polarization of the light beam is added between the liquid sealing container 4 and the first reflecting mirror 31, and a birefringence member, e.g. ¼ wave plate 38, to change direction of polarization of the light beam is added between the liquid sealing container 4 and the second reflecting mirror 32. In this embodiment, a light source emitting linearly polarized light such as semiconductor laser is used as the light source, and the light beam emitted from the light projecting system 21 is turned to linearly polarized light perpendicular to the paper surface. The beam splitter 36 is designed as a polarized light beam splitter having polarizing property, so that it reflects polarized light in a direction perpendicular to the paper surface and transmits polarized light running in parallel to the paper surface.

As a result, the light beam emitted from the light projecting system 21, reflected by the beam splitter 36 and irradiated to the free liquid surface, is turned to linearly polarized light running perpendicularly to the paper surface. The linearly polarized light reflected by the free liquid surface 1 passes through the ¼ wave plate 37 or the ¼ wave plate 38 twice and is converted to linearly polarized light parallel to the paper surface. After returning to the beam splitter 36, the light beam passes through the beam splitter 36 and is projected toward the reflecting mirror 14.

Thus, by designing the beam splitter 36 as a polarized light beam splitter, it is possible to suppress attenuation of the light at the beam splitter 36 as much as possible and to efficiently use it.

Figure 8:
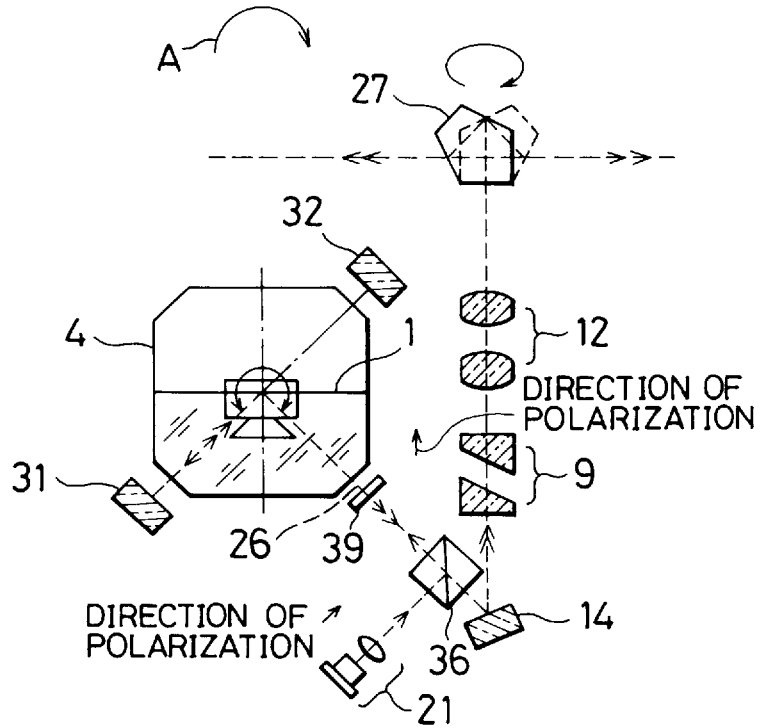
FIG. 8 is a drawing for explaining a seventh embodiment of the present invention.

FIG. 8 represents a seventh embodiment of the invention, which is the same as the sixth embodiment except that a ¼ wave plate 39 is arranged on optical path between the beam splitter 36 and the free liquid surface 1 instead of the ¼ wave plates 37 and 38, and the polarizing property of the beam splitter 36 is the same as in the sixth embodiment.

In this connection, the linearly polarized light coming from the light projecting system 21 and running perpendicularly to the paper surface passes through the ¼ wave plate 39 and the liquid sealing container 4 and is reflected by the first reflecting mirror 31 and the second reflecting mirror 32. After passing through the liquid sealing container 4, the light beam passes through the ¼ wave plate 39 again and is converted to linearly polarized light parallel to the paper surface. Further, the light beam passes through the beam splitter 36 and is projected toward the reflecting mirror 14.

In the seventh embodiment, by designing the beam splitter 36 as a polarized light beam splitter, it is possible to suppress attenuation of light at the beam splitter 36 as much as possible and to efficiently use it.

Figure 12:
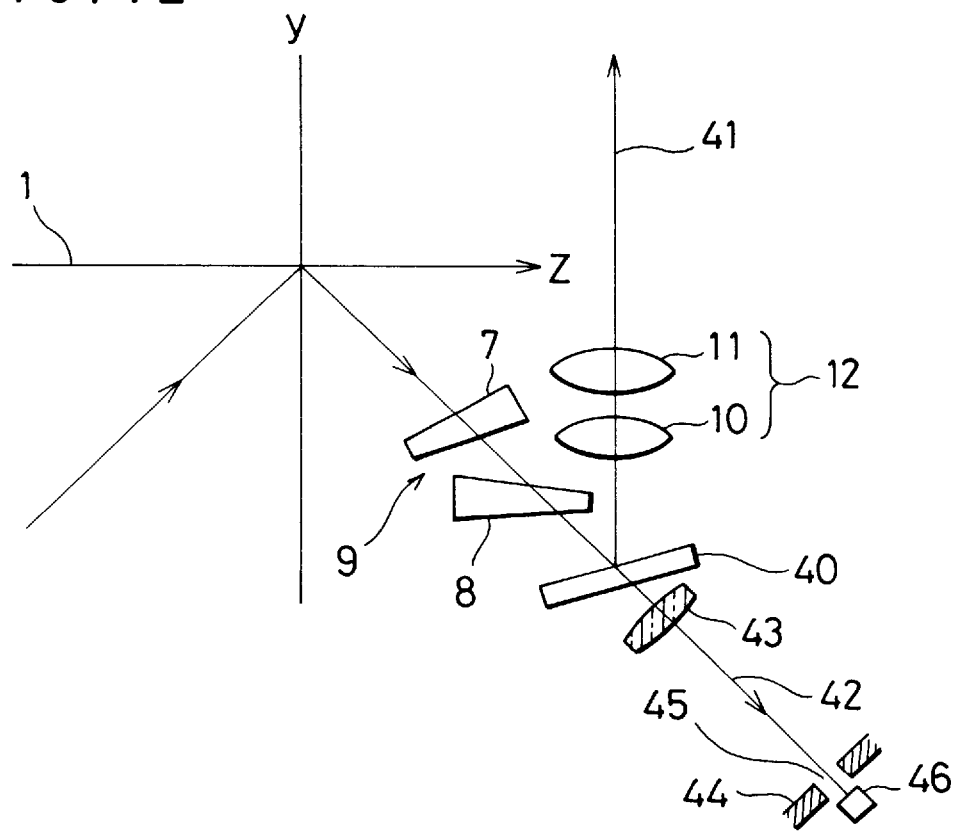
FIG. 12 is a drawing for explaining an application example of the present invention.

FIG. 12 represents an application example of the present invention.

When each of the above embodiments is used in practical application, inclination of the entire system is usually limited. Therefore, it is necessary in practical application to detect whether it is within the limitation of the inclination as required or not. To meet the requirement, it is recommended to perform as follows:

Description is given in the first embodiment shown in FIG. 1. A half-mirror 40 is arranged instead of the reflecting mirror 14, and the anamorphic prism system 9 is moved and is positioned between the half-mirror 40 and the liquid sealing container 4. The reflected light beam from the free liquid surface 1 is split to a reflected light beam 41 directed in vertical direction and a transmitted light beam 42. The transmitted light beam 42 passes through a convex lens 43 and a pinhole 45 formed on a shielding plate 44 and is received by a light receiving element 46. The pinhole 45 is arranged at the focal point of the convex lens 43. The diameter of the pinhole 45 is designed in a size corresponding to the range of limitation.

When the entire system is inclined, optical axis angle is deflected in the reflected light beam from the free liquid surface 1. Because this arrangement comprises a cylindrical lens system 9 as already described, the reflected light beam shows uniform sensitivity in all directions with respect to inclination angle of the entire system. The transmitted light beam 42 passes through the convex lens 43 and the pinhole 45 and is received by the light receiving element 46. Because the pinhole is arranged at the focal point of the convex lens 43, the converged light beam moves along the pinhole 45. If the amount of moving is high, the light beam is shielded by the shielding plate 44.

Figure 13:
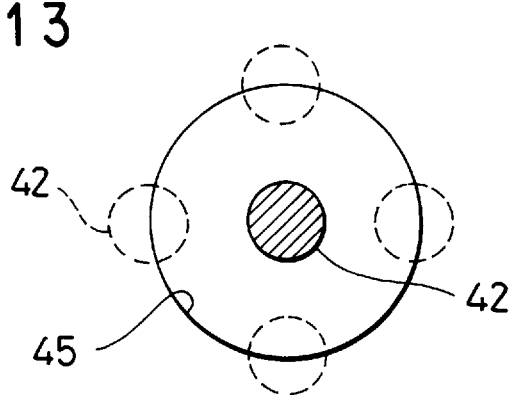
FIG. 13 is a drawing for explaining relationship between beam spot and pinhole in an application example of the present invention.

When this amount of moving exceeds the limitation of inclination as required, the diameter of the pinhole 45 is determined in such manner that the light receiving amount of the light receiving element 46 is less than the light quantity required (see FIG. 13).

By monitoring the light receiving amount of the light receiving element 46, it is possible to judge whether the inclination of the entire system is within the limited angle.

The pinhole 45 may be omitted, and the light receiving element 46 may be designed as a light receiving element such as CCD, and the position of the beam spot may be detected by the light receiving element 46.

As described above, it is possible according to the present invention to automatically compensate optical path regardless of whether the system is in approximately horizontal position or in approximately vertical position without requiring a specially prepared optical system or an additional mechanism to replace a part of the optical system. This contributes to simple design of the system and higher working efficiency as well as high accuracy and reproducibility. Because reflection of the free liquid surface always maintained in horizontal direction is utilized, it can be easily assembled without requiring high grade assembling technique required for conventional pendulum type angle compensator. Instead of suspension of optical members used in the conventional pendulum type angle compensator, liquid is injected in the liquid sealing container. This leads to very easy work and elimination of variability in assembling accuracy due to individual workers. Since the liquid is perfectly sealed, there is no change over time and the system has good proof against changes in environment. External vibration or impact can be controlled by viscosity of the liquid, and no complicated braking device is required.

What we claim are:

1. An automatic angle compensator, comprising a liquid sealing container with transparent liquid to form a free liquid surface sealed therein, a first light projecting system for directing a first light beam at a given angle to the free liquid surface so that it is reflected as a first reflected light beam by the free liquid surface, a second light projecting system arranged face-to-face to the first light projecting system with the free liquid surface therebetween and for directing a second light beam at a given angle to the free liquid surface so that the second light beam is reflected as a second reflected light beam by the free liquid surface when said liquid sealing container, said first light projecting system, said second light projecting system, and the hereinafter-recited projecting optical system are rotated by 90° around an axis which runs perpendicularly or almost perpendicularly to a plane including said first and second light beams, and the projecting optical system for guiding and projecting said first reflected and said second reflected light beams reflected by the free liquid surface.

2. An automatic angle compensator according to claim 1, wherein there is provided a liquid movement preventing plate rotatably arranged in the liquid and having a center of rotation approximately aligned with the free liquid surface.

3. An automatic angle compensator according to claim 1, wherein a light receiving element is provided to receive said first reflected light beam reflected by the free liquid surface through a pinhole in order to detect whether said liquid sealing container, said first light projecting system, said second light projecting system, and said projecting optical system is inclined so that the light receiving element receives said first reflected light beam.

4. An automatic angle compensator, comprising a liquid sealing container with transparent liquid to form a free liquid surface sealed therein, a light projecting system for directing a light beam at a given angle to the free liquid surface, a first reflecting member for reflecting and guiding the light beam reflected as a first reflected light beam by the free liquid surface when said liquid sealing container, said light projecting system, said first reflecting member, the hereinafter-recited second reflecting member, and the hereinafter-recited projecting optical system are inclined by 0°, and a second reflecting member arranged face-to-face to the first reflecting member and for reflecting and guiding the light beam reflected as a second reflected light beam by the free liquid surface when said liquid sealing container, said light projecting system, said first reflecting member, said second reflecting member, and the hereinafter-recited projecting optical system are rotated by 90° around an axis which runs perpendicularly or almost perpendicularly to a plane including said light beam directed by said light projecting system, and the projecting optical system for projecting said first and second reflected light beams reflected by the free liquid surface.

5. An automatic angle compensator according to claim 4, wherein there is provided a liquid movement preventing plate rotatably arranged in the liquid and having a center of rotation approximately aligned with the free liquid surface.

6. An automatic angle compensator according to claims 4 or 5, wherein the projecting optical system comprises a beam splitter at a position where said first and second reflected light beams from the first reflecting member and the second reflecting member cross each other.

7. An automatic angle compensator according to claim 6, wherein the light projecting system irradiates polarized light having a predetermined direction of polarization, the projecting optical system comprises a birefringence member for changing direction of polarization to at least one of the optical path including the first reflecting member or the optical path including the second reflecting member, and the beam splitter is a polarized light beam splitter.

8. An automatic angle compensator, comprising a liquid sealing container having transparent liquid to form a free liquid surface sealed therein, a light projecting system for irradiating a light beam at a given angle to the free liquid surface, a first reflecting member for reflecting and guiding again the light beam reflected as a first reflected light beam by the free liquid surface toward the free liquid surface when said liquid sealing container, said light projecting system, said first reflecting member, the hereinafter-recited second reflecting member, and the hereinafter-recited projecting optical system are inclined by 0°, and a second reflecting member arranged face-to-face to the first reflecting member and for reflecting and guiding again the light beam reflected as a second reflected light beam by the free liquid surface toward the free liquid surface when said liquid sealing container, said light projecting system, said first reflecting member, said second reflecting member, and the hereinafter-recited projecting optical system are rotated by 90° around an axis which runs perpendicularly or almost perpendicularly to a plane including said light beam irradiated by said light projecting system, and the projecting optical system for guiding and projecting said first and second reflected light beams reflected again by the free liquid surface.

9. An automatic angle compensator according to claim 8, wherein there is provided a liquid movement preventing plate rotatably arranged in the liquid and having a center of rotation approximately aligned with the free liquid surface.

10. An automatic angle compensator according to claims 6 or 9, wherein a beam splitter is arranged on optical path of the light projecting system in order to separate the light beam from the light projecting system from the reflected light beam from the free liquid surface.

11. An automatic angle compensator according to claim 10, wherein there are provided the light projecting system for irradiating polarized light having a predetermined direction of polarization, a birefringence member arranged between the free liquid surface and the first reflecting member to change the direction of polarization and a birefringence member arranged between the free liquid surface and the second reflecting member to change the direction of polarization, and the beam splitter is a polarized light beam splitter.

12. An automatic angle compensator according to claim 10, wherein the light projecting system irradiates polarized light having a predetermined direction of polarization, a birefringence member is provided between the free liquid surface and beam splitter to change the direction of polarization, and the beam splitter is a polarized light beam splitter.

13. An automatic angle compensator according to one of claims 2, 4 or 9, wherein the liquid movement preventing plate is transparent and is located a little below the free liquid surface and is provided with weights to maintain it in horizontal.

14. An automatic angle compensator according to claim 4 or 8, wherein a light receiving element is provided to receive said first reflected light beam reflected by the free liquid surface through a pinhole in order to detect whether said liquid sealing container, said light projecting system, said first reflecting member, said second reflecting member, and said projecting optical system is inclined so that the light receiving element receives said first reflected light beam.

\* \* \* \* \*

UNITED STATES PATENT AND TRADEMARK OFFICE
CERTIFICATE OF CORRECTION

PATENT NO. : 5,847,824

DATED : December 8, 1998

INVENTOR(S) : TORU MAEDA

It is certified that error appears in the above-identified patent and that said Letters Patent is hereby corrected as shown below:

```
      On the title page: Item
[30] FOREIGN APPLICATION PRIORITY DATA

Insert: --[30] Foreign Application Priority Data
             February 28, 1995 [JP] Japan ... 7-64721--.

[56] REFERENCES CITED IN OTHER PUBLICATIONS

"Transmissin" should read --Transmission--.
```

Signed and Sealed this

Fourth Day of January, 2000

Attest:

Attesting Officer

*Acting Commissioner of Patents and Trademarks*